Sept. 8, 1925.  1,552,699
R. HILDEBRAND
INTERNAL COMBUSTION ENGINE
Filed Nov. 15, 1923  2 Sheets-Sheet 1
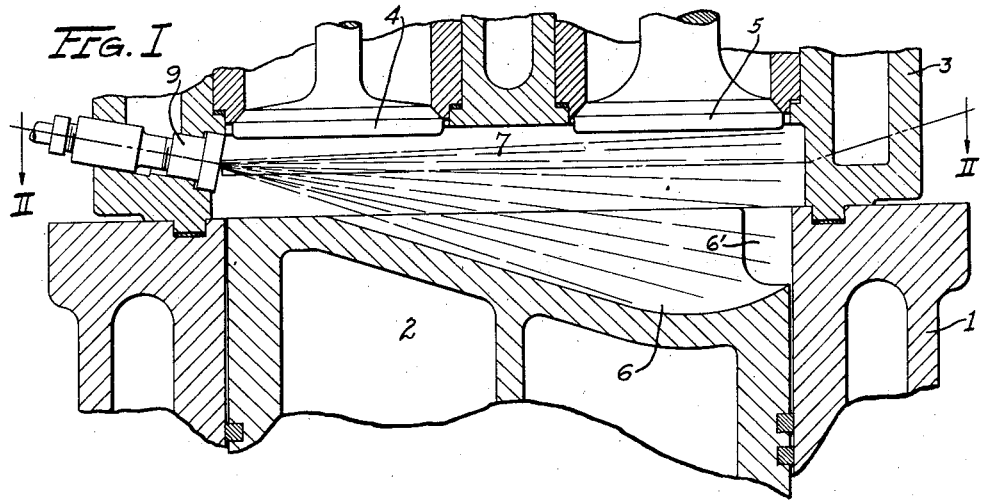
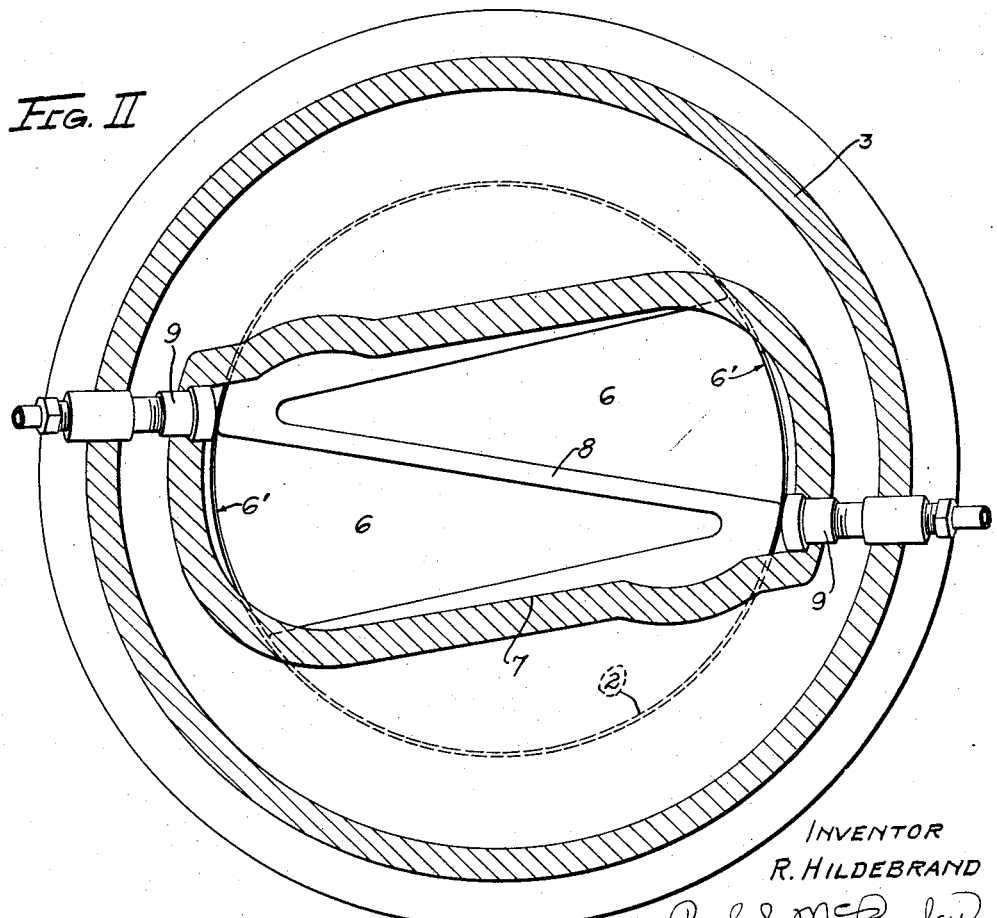
INVENTOR
R. HILDEBRAND
By Cook & McCauley
ATTORNEYS Sept 8, 1925.  
R. HILDEBRAND  
INTERNAL COMBUSTION ENGINE  
Filed Nov. 15, 1923  
1,552,699  
2 Sheets-Sheet 2
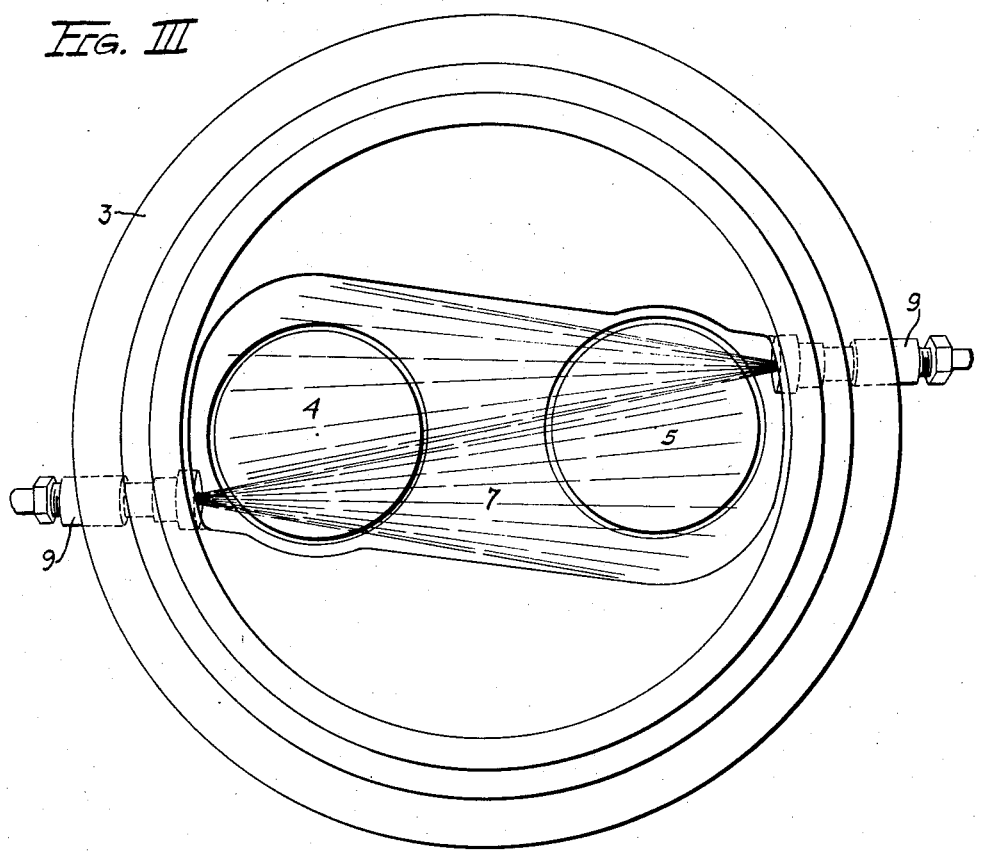
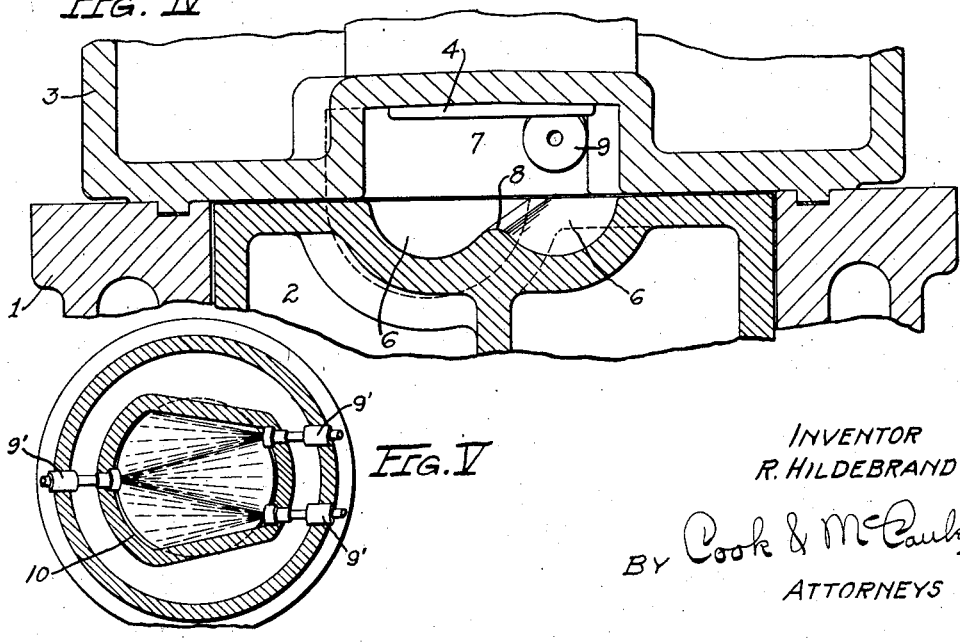
INVENTOR  
R. HILDEBRAND  
BY Cook & McCauley  
ATTORNEYS Patented Sept. 8, 1925.

1,552,699

UNITED STATES PATENT OFFICE.

REINHARD HILDEBRAND, OF WEBSTER GROVES, MISSOURI, ASSIGNOR TO FULTON IRON WORKS COMPANY, OF ST. LOUIS, MISSOURI, A CORPORATION OF DELAWARE.

INTERNAL-COMBUSTION ENGINE.

Application filed November 15, 1923. Serial No. 674,857.

*To all whom it may concern:*

Be it known that I, REINHARD HILDEBRAND, a citizen of Germany, a resident of Webster Groves, in the county of St. Louis, State of Missouri, have invented certain new and useful Improvements in Internal-Combustion Engines, of which the following is a full, clear, and exact description, reference being had to the accompanying drawing, forming a part of this specification.

This invention relates to improvements in internal combustion engines, and the novel features are particularly adapted for use in oil engines wherein the fuel is discharged into air at a temperature high enough to ignite the mixture.

The main object of the invention is to obtain a thorough mixture of the air and liquid fuel. More specifically stated, an object is to obtain a very effective mixture by using nozzles whereby liquid fuel alone is injected into the hot air, thus dispensing with the compressed air ordinarily used for the injection of the fuel.

Prior to this invention, engines of this type have been provided with nozzles for the injection of the liquid fuel alone, but this is regarded as a rather modern departure involving problems that are not generally recognized, and great difficulty has been experienced in obtaining even a fair degree of efficiency from such nozzles. The problem lies in the mixing of a body of liquid fuel with the highly heated air, the object being to ignite and completely consume the fuel during a very brief period. Heretofore, two or more streams of liquid fuel have been discharged from opposing nozzles pointing toward the middle of the combustion chamber, and the theory has been that the combustion will be completed when the liquid reaches a point midway between the nozzles. However, I have found that the fuel in the opposing streams is not completely burned when the midway point is reached, and that some of the fuel particles of the two streams pass beyond this point. This is not desirable because it overcharges the central part of the combustion chamber with fuel oil, and the fuel passing the midway point comes into contact with burned gases, instead of air, and this results in incomplete combustion.

My object is to distribute fine particles of liquid fuel through the hot air in the combustion chamber by means of two or more streams of fuel so arranged that they penetrate almost all of the space in the combustion chamber, without penetrating each other. This combination and arrangement of elements results in a substantially uniform combustible mixture which is readily ignited and consumed, thereby obtaining high efficiency and all of the other advantages resulting from approximately complete combustion. Instead of attempting to discharge the liquid fuel to a point of impact, or otherwise causing one stream of liquid to retard or interfere with another, I preferably discharge the fuel in the form of fine sprays which freely enter into and commingle with the air throughout the combustion chamber.

In the preferred form of the invention, fuel-injecting nozzles are arranged to discharge conical sprays of finely divided fuel from opposite sides of the combustion chamber. These sprays of liquid move in opposite directions, but the nozzles are offset relative to each other, so the fine particles of liquid in each spray will freely penetrate the air in the combustion chamber, without impinging against or uniting with another spray. The offset nozzles discharge their conical sprays through different portions of the combustion chamber, and said nozzles are preferably so arranged that the sprays will lie alongside of each other with the apex of one conical spray adjacent to the base of another correspondingly formed spray. The fine sprays can thus be produced in the form of reversely arranged cones extending from side to side of the combustion chamber, and by making the walls of the combustion chamber conform approximately to the shape and dimensions of the sprays, I obtain a substantially uniform combustible mixture throughout the combustion chamber.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a fragmentary vertical section showing portions of a piston, cylinder and cylinder head provided with a charge-mixing device made in accordance with this invention.

Fig. II is a section taken approximately on the line II—II in Fig. I.

Fig. III is a bottom view of the cylinder head.

Fig. IV is a vertical section taken approximately through the center of Fig. I.

Fig. V is a view similar to Fig. I drawn to a smaller scale and illustrating another form of the invention.

1 designates an engine cylinder provided with a piston 2, and 3 designates the cylinder head containing valves 4 and 5 to control the admission of air and the discharge of products of combustion.

The combustion chamber is formed partly by flaring cavities 6 in the end of the piston and partly by a larger cavity 7 formed in the cylinder head and facing the cavities 6. The adjacent sides of the flaring cavities are approximately parallel with each other, and a straight rib 8 is formed between said cavities 6.

Fuel-injecting nozzles 9 extend through opposite sides of the cylinder head, and it will be important to observe that these nozzles are not in alinement with each other. They are offset to discharge the liquid fuel across different portions of the combustion chamber. Each nozzle is adapted to discharge a conical spray of fuel, as suggested by Figs. I and III, and owing to the arrangement of the nozzles, the sprays are in the form of a double cone with the conical elements alongside of each other. The apex of each conical element lies adjacent to and at one side of the other conical element, and the adjacent sides of the sprays are approximately parallel with each other.

The conical sprays preferably extend across the end of the piston, and the combustion chamber conforms approximately to the shape and dimensions of the sprays. If the combustion chamber contains inlet and exhaust valves 4 and 5, it will not be convenient or desirable to make its walls conform precisely to the shape of the conical sprays. However, this general shape can be rather closely adhered to, as shown by Figs. I and II. The nozzles 9 are inclined toward the piston where the reversely arranged flaring cavities 6 conform to the sprays. These cavities 6 extend almost entirely across the piston. The relatively large cavity 7 in the cylinder head contains the valves 4 and 5, but Fig. I shows that its upper face lies approximately parallel with the top line of the sprays, and Fig. III shows that it has side walls conforming approximately to the angle of the outer sides of the sprays. The relatively large cavity 7 is in free communication with the cavities 6.

It will thus be understood that the combustion chamber comprises conoidal cavities in free communication with each other, and I prefer to form a single combustion chamber conforming approximately to the shape of the sprays. Figs. I and II show that the nozzles 9 are alined with the respective cavities 6, and that each nozzle lies at the small end of one of these tapering cavities. The cavities should be so long that the sprays will not be forcibly discharged onto the walls at their relatively wide ends, and each cavity 6 may therefore be continued through one side of the piston. As shown at 6' in Figs. I and II, the cylinder may be utilized to form the walls at the wide ends of cavities 6.

To appreciate the results of the combination herein disclosed, one should observe that if each minute particle of liquid fuel in a fine mist, or spray, is entirely surrounded by the air, a highly combustible mixture will be obtained. It is especially desirable to produce this condition throughout the entire body of air in the combustion chamber. On the other hand, if the sprays were discharged into each other, there would be a tendency for the liquid particles to unite and form relatively large drops which would not be consumed, and if the sprays were forcibly discharged onto walls of the combustion chamber, the liquid on the walls would likewise tend to unite and it would not be completely surrounded by the air. Furthermore, if the sprays were discharged into each other, the liquid particles of one spray would enter the combustion space of the other spray and come into contact with burned gases instead of air.

The offset nozzles produce separate and distinct sprays wherein the tiny liquid particles diverge from each other, and there is no opportunity for the sprays to unite and form relatively large drops. Furthermore, the combustion chamber conforms approximately to the shape and dimensions of the sprays, thus avoiding the consequences of discharging the liquid fuel onto the walls of the combustion chamber. Almost all of the air in the combustion chamber is penetrated by the sprays, and each minute particle of liquid fuel is surrounded by the hot air. The resultant highly combustible mixture is very readily ignited and quickly consumed, so as to eliminate or materially reduce the usual losses due to imperfect combustion.

I claim:

1. An internal combustion engine provided with a combustion chamber, and fuel-injecting nozzles whereby conical sprays of fuel are discharged across said combustion chamber without impinging against each other, said nozzles being arranged at opposite sides of the combustion chamber and offset relative to each other so as to discharge the conical sprays across different portions of the combustion chamber, and said combustion chamber having walls conforming approximately to said conical sprays.

2. An internal combustion engine having a piston forming part of its combustion chamber, and fuel-injecting nozzles whereby conical sprays of fuel are discharged across said piston, said nozzles being offset relative to each other so that the conical sprays will lie alongside of each other, with the apex of one spray adjacent to but at one side of the base of another spray, and the confining walls of said combustion chamber being provided with conoidal inner faces conforming approximately to the conical sprays.

3. An internal combustion engine having a combustion chamber approximately in the form of reversely arranged cones with the apex of one conical element adjacent to the base of another of the conical elements, and fuel-injecting nozzles arranged at the apices of the conical elements, said nozzles being offset from each other and alined with the respective conical elements.

4. An internal combustion engine having a combustion chamber conforming approximately to a double cone with the conical elements side by side and the apex of one conical element adjacent to the base of the other, and fuel-injecting nozzles arranged at the apices of the conical elements, said nozzles being offset from each other and alined with the respective conical elements.

5. An internal combustion engine having fuel-injecting nozzles adapted to discharge conical sprays of fuel, and a combustion chamber comprising conoidal cavities formed alongside of each other and in free communication with each other at their adjacent sides, the relatively wide end of one of said conoidal cavities being adjacent to and at one side of the narrow end of another of said cavities, said nozzles being offset relative to each other and alined with the respective cavities, and the discharge end of each of said nozzles being at the small end of one of said cavities.

6. An internal combustion engine having a piston forming part of its combustion chamber, and fuel-injecting nozzles whereby conical sprays of fuel are discharged across said piston, said nozzles being offset relative to each other so that the conical sprays will lie alongside of each other, with the apex of one spray adjacent to but at one side of the base of another spray, and said piston being provided with reversely arranged flaring cavities alined with the respective nozzles to receive portions of the sprays discharged therefrom.

7. An internal combustion engine having a piston forming part of its combustion chamber, and fuel-injecting nozzles whereby conical sprays of fuel are discharged across said piston, said nozzles being offset relative to each other so that the conical sprays will lie alongside of each other, with the apex of one spray adjacent to but at one side of the base of another spray, said piston being provided with reversely arranged flaring cavities alined with the respective nozzles to receive portions of the sprays discharged therefrom, and a cylinder head having a relatively large cavity facing the flaring cavities in the piston.

8. An internal combustion engine having a piston forming part of its combustion chamber, and fuel-injecting nozzles whereby conical sprays of fuel are discharged across said piston, said nozzles being offset relative to each other so that the conical sprays will lie alongside of each other, with the apex of one spray adjacent to but at one side of the base of another spray, said piston being provided with reversely arranged flaring cavities alined with the respective nozzles to receive portions of the sprays discharged therefrom, and a cylinder head having a relatively large cavity facing the flaring cavities in the piston, said nozzles being secured in the cylinder head and inclined toward the cavities in the piston.

In testimony that I claim the foregoing I hereunto affix my signature.

REINHARD HILDEBRAND.